United States Patent
Zhou et al.

(10) Patent No.: US 11,889,489 B2
(45) Date of Patent: Jan. 30, 2024

(54) BEAM FAILURE DETECTION AND RECOVERY

(71) Applicant: QUALCOMM Incorporated, San Diego, CA (US)

(72) Inventors: Shanyu Zhou, San Diego, CA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/371,462

(22) Filed: Jul. 9, 2021

(65) Prior Publication Data

US 2023/0009390 A1    Jan. 12, 2023

(51) Int. Cl.
*H04L 12/26*        (2006.01)
*H04W 72/044*    (2023.01)
*H04W 24/08*      (2009.01)

(52) U.S. Cl.
CPC ......... *H04W 72/046* (2013.01); *H04W 24/08* (2013.01)

(58) Field of Classification Search
CPC ... H04W 72/046; H04W 24/08; H04B 7/0695
See application file for complete search history.

(56) References Cited

U.S. PATENT DOCUMENTS

| | | | |
|---|---|---|---|
| 11,490,442 B2 * | 11/2022 | Cirik | H04W 72/23 |
| 2019/0297648 A1 * | 9/2019 | Nagaraja | H04B 7/063 |
| 2019/0313264 A1 * | 10/2019 | Lin | H04W 24/04 |
| 2021/0044342 A1 * | 2/2021 | He | H04B 7/0695 |
| 2021/0153284 A1 * | 5/2021 | Zhou | H04L 41/0668 |
| 2022/0007258 A1 * | 1/2022 | Liou | H04W 72/23 |
| 2022/0103232 A1 * | 3/2022 | Zhou | H04W 76/19 |
| 2023/0076253 A1 * | 3/2023 | Zhou | H04L 1/203 |

FOREIGN PATENT DOCUMENTS

| | | | | |
|---|---|---|---|---|
| CA | 3034014 A1 * | 8/2019 | | H04B 7/0626 |
| CA | 3094871 A1 * | 3/2021 | | H04B 7/0695 |
| CA | 3095196 A1 * | 4/2021 | | H04B 7/0639 |
| EP | 3783809 A1 * | 2/2021 | | H04B 7/0695 |
| WO | WO-2019138081 A1 * | 7/2019 | | H04B 7/0695 |
| WO | WO-2022133009 A2 * | 6/2022 | | |
| WO | WO-2022197652 A1 * | 9/2022 | | |

* cited by examiner

*Primary Examiner* — Thai D Hoang
(74) *Attorney, Agent, or Firm* — Patterson + Sheridan, LLP

(57) ABSTRACT

Certain aspects of the present disclosure provide techniques for beam failure detection and recovery. An example method of wireless communication by a user equipment generally includes detecting a beam failure associated with a reference signal from a network entity and transmitting, to the network entity before initiating a beam failure recovery procedure, a request for a beam switch in response to the detected beam failure. The method also includes receiving, from the network entity, an indication to communicate via a beam in response to the request and communicating with the network entity via the beam based on the indication.

30 Claims, 10 Drawing Sheets

BEAM FAILURE DETECTION AND RECOVERY

INTRODUCTION

Aspects of the present disclosure relate to wireless communications, and more particularly, to techniques for beam management.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE). The method generally includes detecting a beam failure associated with a reference signal from a network entity and transmitting, to the network entity before initiating a beam failure recovery procedure, a request for a beam switch in response to the detected beam failure. The method also includes receiving, from the network entity, an indication to communicate via a beam in response to the request and communicating with the network entity via the beam based on the indication.

One aspect provides a method of wireless communication by a network entity. The method generally includes receiving, from a UE, a request for a beam switch before a beam failure recovery procedure is initiated and selecting a beam for communication with the UE among a plurality of beams in response to the request. The method also includes transmitting, to the UE, an indication to communicate via the selected beam and communicating with the UE via the beam based on the indication.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for beam failure detection and recovery.

Beam failure detection using a beam failure count framework and beam failure recovery using a random access channel (RACH) procedure take a certain amount of time for a user equipment (UE) to switch from a failed beam to another beam. In certain cases, the UE declares beam failure when the beam failure instance indication (BFI) counts reach a maximum count threshold, and in response to the beam failure, the UE initiates a random access procedure. Such a procedure for beam failure detection and recovery may be time and power consuming at the UE. That is, the beam failure detection and recovery procedure may cause increased delay and energy consumption at the UE, for example, when a particular beam provides poor channel conditions.

Aspects of the present disclosure provide techniques and apparatus for beam failure detection and recovery. For example, before performing a beam failure recovery procedure using the RACH, a UE may request a beam switch from a network entity. The request may also include a report providing preferred candidate beam(s), a reason for beam failure, and/or channel conditions of the failed beam and/or candidate beam(s). In certain aspects, the UE may declare beam failure using separate criteria than counting BFIs as previously described. For example, the UE may declare beam failure based on a measure of an energy level of a reference signal for a period of time or a detection of blocking of the reference signal for another period of time. Such detection criteria may provide faster detection of beam failure than counting BFIs as previously described. Such detection criteria may be activated by the network or the UE, for example, based on channel conditions and/or a specific service type.

The aspects for beam failure detection and recovery described herein may enable faster establishment of a new beam for the UE and/or faster initiation of the RACH procedure in response to beam failure detection. Stated another way, the aspects for beam failure detection and recovery described herein may enable desirable performance, such as desirable data rate and/or latency, for example, due to the beam failure detection without BFI counts, the beam switch request, beam failure reporting, and/or initiation of RACH procedure.

Introduction to Wireless Communication Networks

Figure 1:
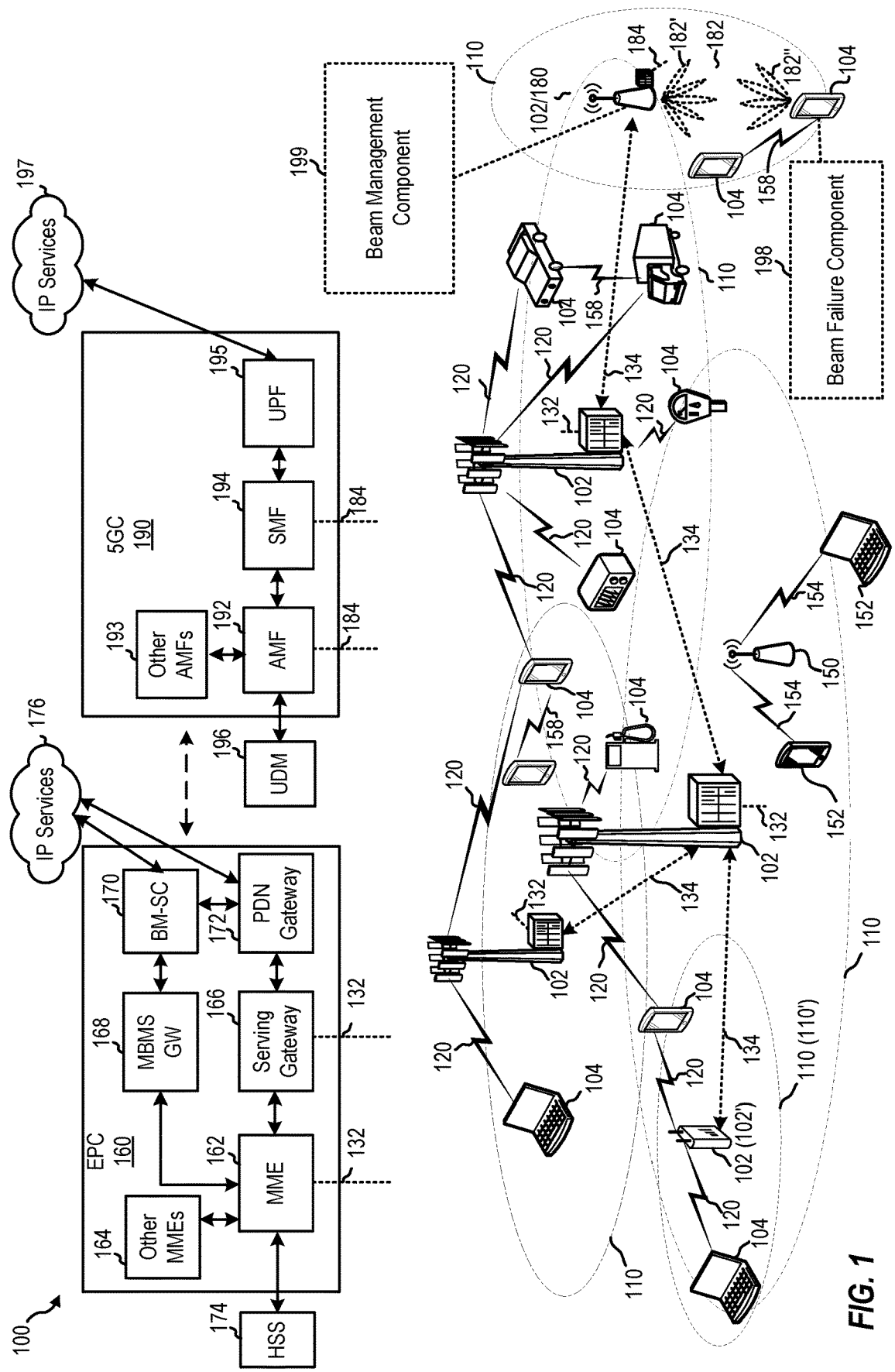
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5 GC) network 190, which interoperate to provide wireless communications services.

Base stations 102 may provide an access point to the EPC 160 and/or 5 GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes beam management component 199, which may be configure a UE with parameters associated with beam failure detection and recovery and respond to an indication of beam failure (such as a beam switch request) at a UE, in accordance with aspects of the present disclosure further described herein. Wireless network 100 further includes beam failure component 198, which may detect a beam failure, transmit a beam switch request to a base station, and communicate via beam indicated in a response to the beam switch request from the base station, in accordance with aspects of the present disclosure further described herein.

Figure 2:
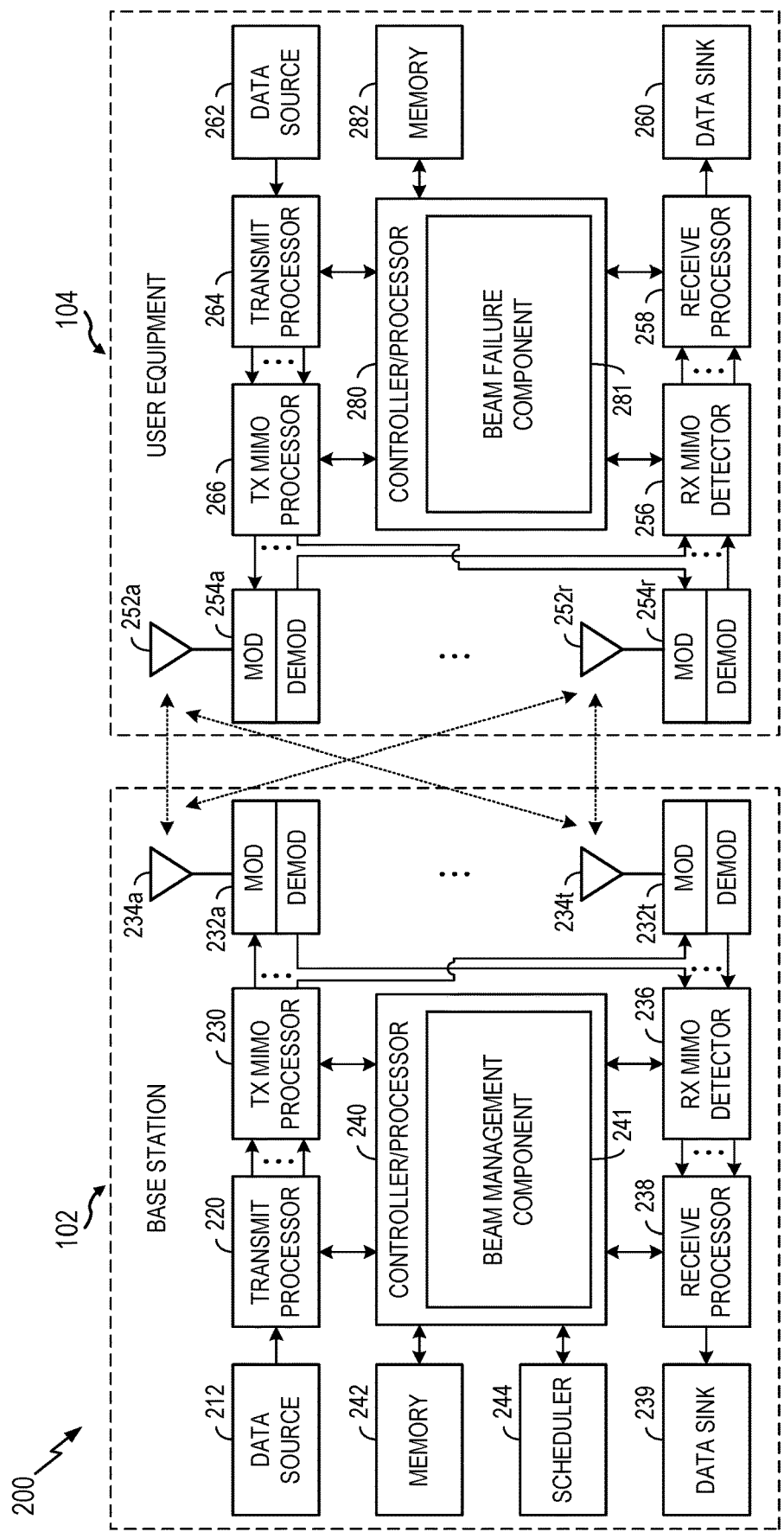
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes beam management component 241, which may be representative of beam management component 199 of FIG. 1. Notably, while depicted as an aspect of controller/processor 240, the beam management component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes a beam failure component 281, which may be representative of the beam failure component 198 of FIG. 1. Notably, while depicted as an aspect of controller/processor 280, the beam failure component 281 may be implemented additionally or alternatively in various other aspects of user equipment 104 in other implementations.

Figure 3:
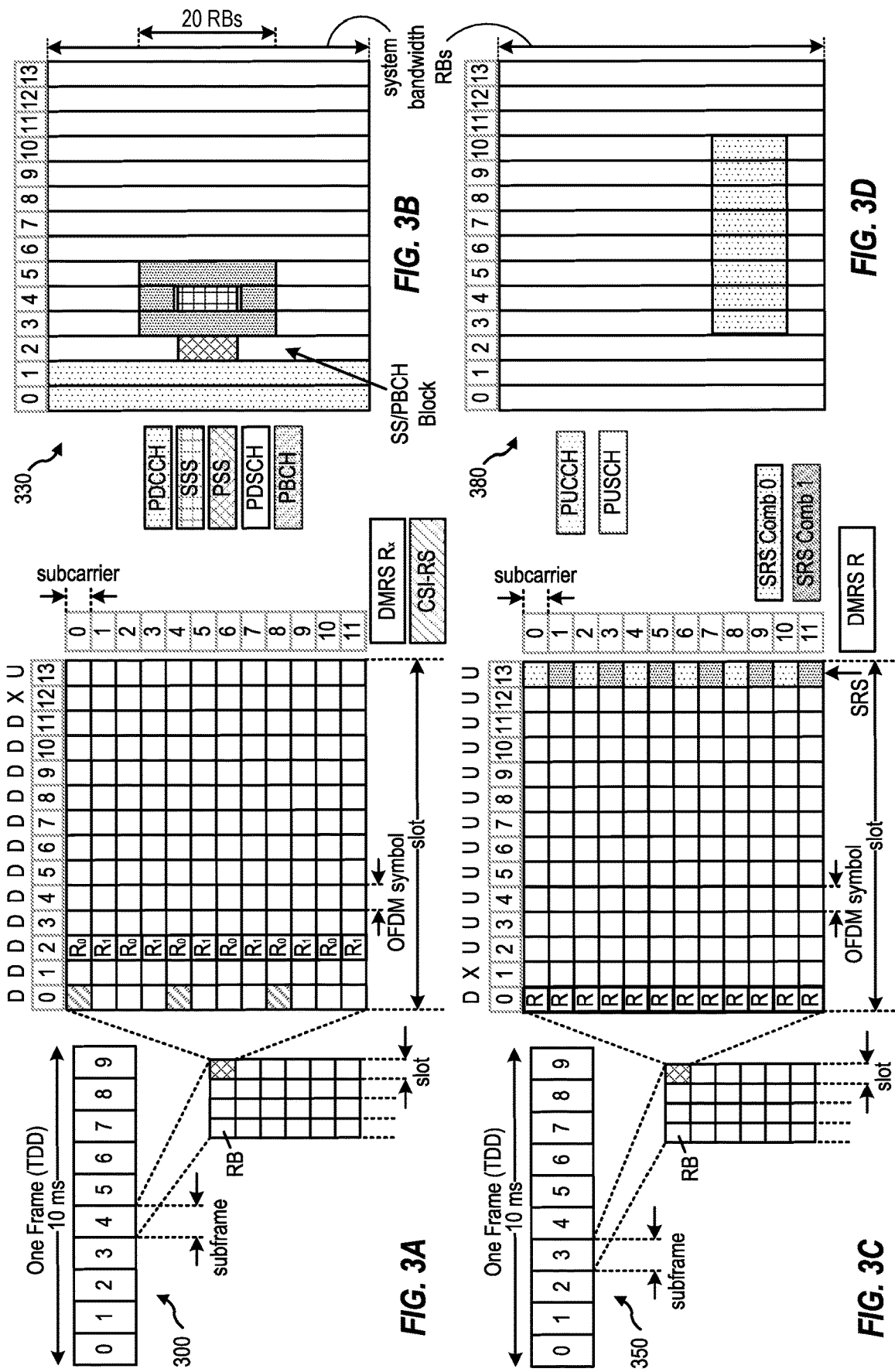
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, a UE communicating in the mmWave bands may use the beam management aspects described herein to facilitate beam failure detection and recovery.

Introduction to Random Access Channel Procedures

Figure 5A:
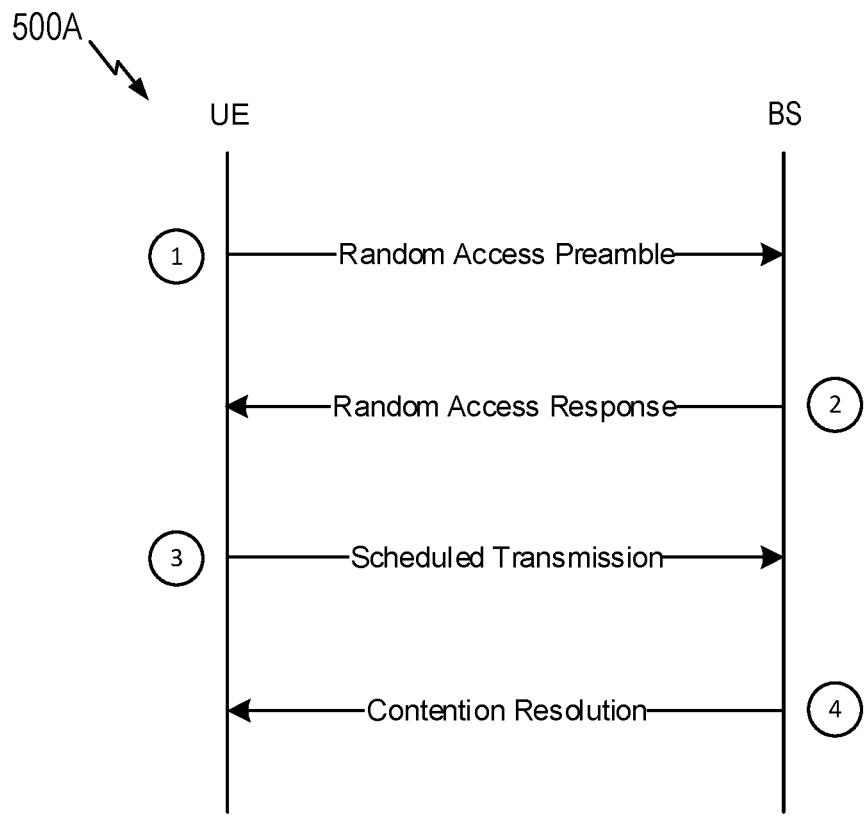
FIGS. 5A and 5B are signaling flows illustrating example random access channel procedures.

In various scenarios, a UE may communicate with a network entity (such as a base station) via a random access channel (RACH) procedure. For example, the UE may use a RACH procedure for initial radio resource control (RRC) connection setup, RRC connection re-establishment, a handover scenario, a scheduling request failure, beam failure recovery, downlink or uplink data arrival, etc. FIG. 5A illustrates an example four-step RACH procedure 500A, in accordance with certain aspects of the present disclosure. In a first message (MSG1), the UE transmits a random access (RA) preamble to the BS. The UE may monitor for a response from the BS within a configured time window. The UE may receive the random access response (RAR) from the BS, where the RAR may include uplink scheduling for the UE. Upon reception of the RAR, the UE sends a third message (MSG3) using the uplink grant scheduled in the response and monitors for contention resolution. If contention resolution is not successful after the MSG3 transmission and/or retransmission(s) of MSG3, the UE may go back to the MSG1 transmission.

Figure 5B:
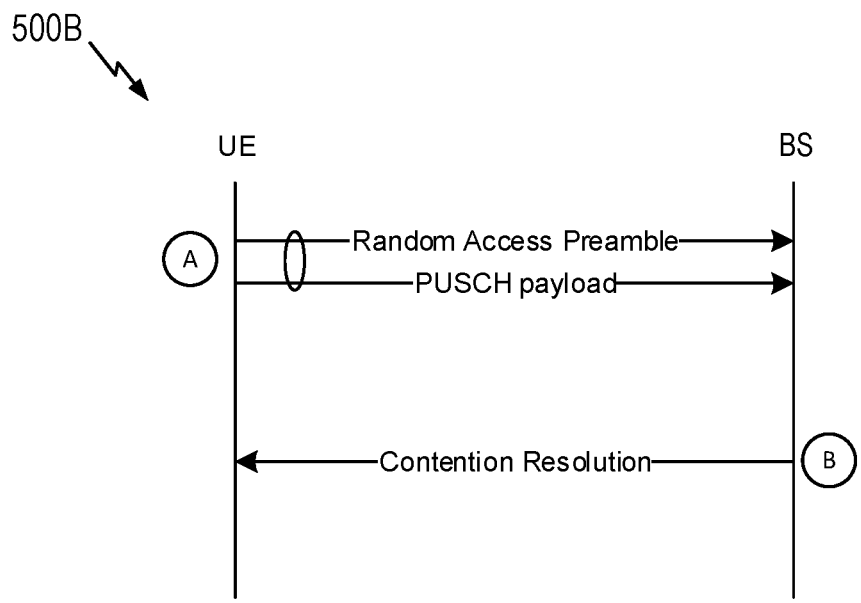

FIG. 5B illustrates an example of a two-step RACH procedure 500B, where contention resolution is successful at the BS, in accordance with certain aspects of the present disclosure. The UE may transmit in a first message (MSGA) including a preamble on a physical random access channel (PRACH) and a payload on a PUSCH. After the MSGA transmission, the UE monitors for a response from the BS within a configured time window. If contention resolution is successful upon receiving the network response (MSGB), the UE ends the random access procedure, and in certain cases, the UE may communicate with the BS in a connected state. Aspects of the present disclosure may also apply to contention-free random access (CFRA) procedures, where the network may initially provide a RA preamble and/or uplink resource assignment to the UE.

Introduction to Beamforming and Beam Management

Figure 4:
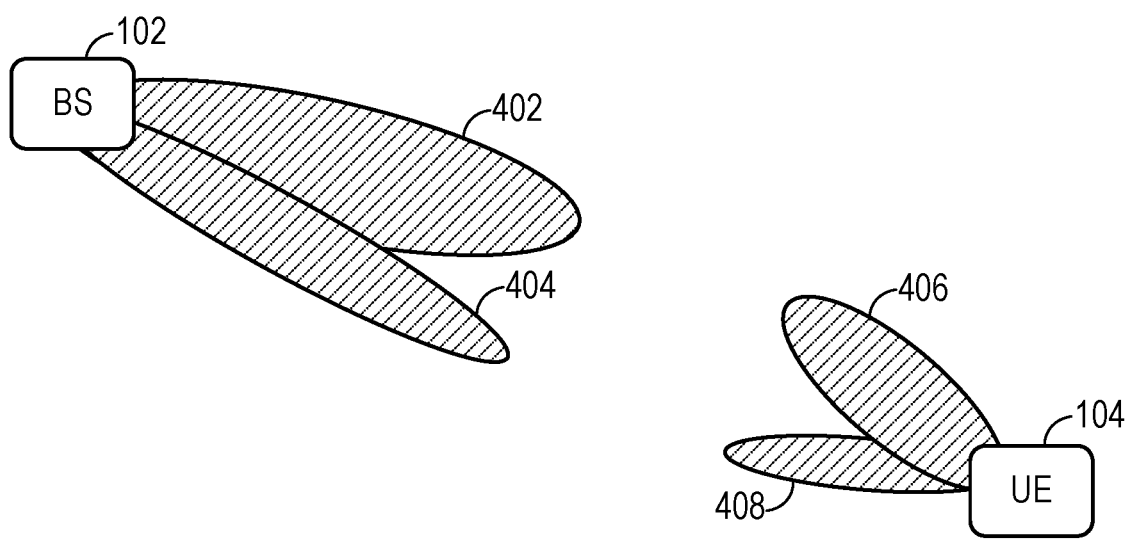
FIG. 4 is a diagram illustrating an example of wireless communications with beamforming.

In certain cases, wireless communication devices may communicate via beamformed transmissions, which may be referred to as beams. FIG. 4 illustrates an example a UE and BS communicating via beamformed transmissions. As shown, the BS 102 may communicate with the UE 120 via beams 402, 404, and the UE 104 may communicate with the BS 110 via beams 406, 408. For example, the BS 110 may transmit data via the beam 402 and reference signals (e.g., SSBs and/or CSI-RSs) via the beams 402, 404 as transmit beams, and the UE 120 may receive the data via the beam 406 and monitor the references signals via the beams 406, 408 as receive beams for beam selection and/or beam refinement. As an example, the UE 120 may determine that the beam 408 provides better channel conditions than the beam 406, according to various aspects as further described herein, and the UE 120 may switch to the beam 408 to communicate with the BS 110.

The BS may monitor beams and perform beam management using feedback from a UE and/or measurements of UL reference signals from the UE. For example, a BS may monitor beams using feedback from the UE providing measurements of DL reference signals corresponding to certain beams. The BS may transmit one or more DL reference signals (e.g., measurement reference signal (MRS), channel state information reference signal (CSI-RS), or a synchronization signal (e.g., PSS and SSS) via one or more beams (e.g., the beams 402, 404). The UE may monitor the DL reference signals and report, to the BS, various indications of the channel conditions associated with the beams, such as a channel quality indicator, signal-tonoise ratio (SNR), signal-to-interference plus noise ratio (SINR), signal-to-noise plus distortion ratio (SNDR), a received signal strength indicator (RSSI), and/or a reference signal receive power (RSRP).

Beams may have different functionalities and characteristics. Stated otherwise, the functionalities of one or more beams may be different than the functionalities other beams. For example, a first set of beams may convey control information (e.g., downlink control information (DCI), radio resource control (RRC) signaling, and/or medium access control (MAC) signaling), and a second set of beams may convey data. As another example, beams in a first set may be transmitted in a first direction (e.g., elevation and/or azimuthal directions), and beams in a second set may be transmitted in a second direction (e.g., elevation and/or azimuthal directions), which is different than the first direction. Beam shapes (e.g., beam width, beam pattern, etc.) may vary. For example, the shape of control beams from a BS may be different (e.g., wider allowing for larger cell coverage) than a shape of data beams from the same base station.

The term "beam" may be used in the present disclosure in several different contexts. Beam may be used to mean a set of pre-coding weights or co-phasing weights applied to antenna elements in a UE or network entity (e.g., a base station) for transmission or reception. The term beam may also refer to an antenna or radiation pattern resulting from the application of such pre-coding weights or to at least one reference signal transmitted while applying the set of pre-coding weights to the antenna elements; at least one sequence used for the generation of the at least one reference signal. Other references include to a set of properties associated to this antenna pattern, such as a gain, directivity, beam width, beam direction (with respect to a plane of reference) in terms of azimuth and elevation, peak to side lobe ratio or to at least one antenna port associated to such an antenna pattern. Additionally, the term beam may refer to an associated number and/or configuration of antenna elements (e.g., a linear array, a rectangular array, or other array).

In certain wireless communication systems (e.g., 5G NR), a medium access control (MAC) entity may be configured by RRC per Serving Cell with a beam failure recovery procedure which may be used for indicating to the serving network entity of a new SSB or CSI-RS when beam failure is detected on the serving SSB(s)/CSI-RS(s). Beam failure may be detected by counting beam failure instance indication (BFI) from the lower layers (e.g., in a protocol stack) to the MAC entity. A UE may detect a beam failure associated with a downlink reference signal, which may correspond to a specific beam (e.g., width and/or direction). The UE may detect the beam failure if the received power of the reference signal is less than or equal to a specific threshold. If the number of beam failures detected is greater than or equal to a maximum count for the beam failure instance (e.g., 1-10 instances as specified by beamFailureInstanceMaxCount) before a time expires, the UE may declare beam failure and initiates a beam failure recovery (BFR) procedure.

For the beam failure recovery procedure, the UE initiates a RACH procedure, such as the RACH procedure 500A and/or 500B, as described herein, using a candidate beam from a candidate beam list. For example, the UE may perform the RACH procedure using the candidate beam having a corresponding reference signal (e.g., SSB and/or CSI-RS) with a RSRP above a threshold. The UE may select an SSB and/or CSI-RS with an RSRP above a threhsold amongst the associated SSBs and/or CSI-RSs in the candidate beam list and set the preamble index to an index corresponding to the selected SSB and/or CSI-RS. The UE may send a beam failure recovery request via the RA preamble (e.g., based on a preamble sequence and/or RA resources specific to a beam failure recovery) and/or the PUSCH message. For the beam failure recovery procedure, the UE may first attempt a CFRA procedure, and if the CFRA is not successful, the UE may perform a contention-based RA (CBRA) procedure, for example, as described herein with respect to FIGS. 5A and/or 5B.

The beam failure detection and recovery procedure as previously described takes a certain amount of time for the UE to switch from a failed beam to another beam. As previously described, the UE declares beam failure when the beam failure instance indications (BFI) counts reach a maximum count threshold, and the UE initiates a RA procedure in response to the beam failure detection. Such a procedure for beam failure detection and recovery may be time and power consuming at the UE. That is, the beam failure detection and recovery procedure as previously described may cause increased delay and energy consumption at the UE, for example, when the beam provides poor channel conditions.

Aspects Related to Beam Failure Detection and Recovery

Aspects of the present disclosure provide techniques and apparatus for beam failure detection and recovery. For example, before performing a beam failure recovery procedure using the RACH, a UE may request a beam switch from a network entity. The request may also include a report providing preferred candidate beam(s), a reason for beam failure, and/or channel conditions of the failed beam and/or candidate beam(s). In certain aspects, the UE may declare beam failure using separate criteria than counting BFIs as previously described. For example, the UE may declare beam failure based on a measure of an energy level of a reference signal for a period of time or a detection of blocking of the reference signal for another period of time. Such detection criteria may provide faster detection of beam failure than counting BFIs as previously described. Such detection criteria may be enabled by the network or the UE based on channel conditions and/or a specific service type. The aspects for beam failure detection and recovery described herein may be generally referred to as enhanced beam failure detection and recovery. That is, enhanced beam failure detection (BFD) may refer to the trigger(s) for declaring or detecting a beam failure, which is separate from the BFI counts. Enhanced beam failure recovery (BFR) may refer to the beam switch request and/or report being sent before initiating a beam failure recovery procedure via the RACH.

The aspects for beam failure detection and recovery described herein may enable faster establishment of a new beam for the UE and/or faster initiation of the RACH procedure in response to beam failure detection. Stated another way, the aspects for beam failure detection and recovery described herein may enable desirable performance, such as desirable data rate and/or latency, for example, due to the beam failure detection without BFI counts, beam switch request, beam failure reporting, and/or initiation of RACH procedure.

Figure 6:
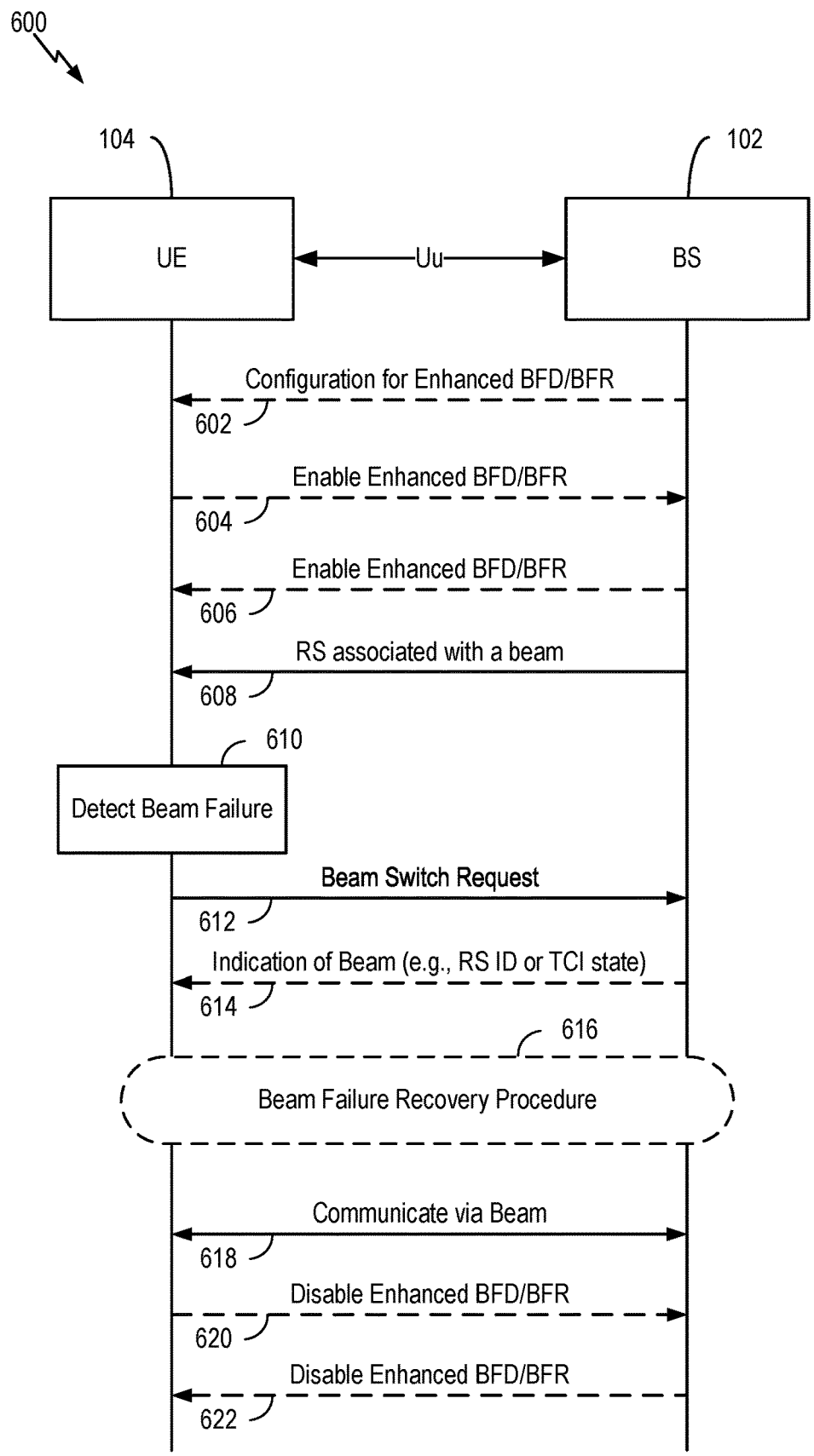
FIG. 6 is a signaling flow illustrating an example of beam failure detection and recovery.

FIG. 6 depicts an example signaling flow 600 for beam failure detection and recovery. In this example, the BS 102 may wirelessly communicate with the UE 104 (e.g., via a Uu interface). The flow may optionally begin at step 602, where the BS 102 may transmit, to the UE 104, a configuration for enhanced BFD and/or BFR, such as indicating information to report with a request for beam switch, as further described herein. As an example, the configuration may indicate for the UE to report preferred candidate beams with the request for beam switch. The configuration may be transmitted via RRC signaling, MAC signaling, DCI, and/or system information.

Optionally, at step 604, the UE 104 may transmit, the BS 102, a request to enable the enhanced BFD and/or enhanced BFR, as further described herein. In certain cases, the UE 104 may transmit an explicit or implicit request to enable the enhanced BFD and/or BFR. For example, the UE 104 may request to enable the request for beam switch via RRC signaling, uplink control information (UCI), and/or MAC signaling. As an example, the UE 104 may request to enable certain criteria (e.g., an RSRP threshold for detecting beam failure) for triggering the beam switch request via RRC signaling, uplink control information (UCI), and/or MAC signaling. In certain cases, the UE 104 may send the enablement request in response to detecting certain criteria, such as a particular service type (e.g., eMBB or URLLC) or a current measure of an energy level (e.g., RSRP) associated with a reference signal being less than a threshold Optionally, at step 606, the UE 104 may receive, from the BS 102, an indication to enable the enhanced BFD and/or BFR. In certain cases, the BS 102 may explicitly or implicitly indicate to enable the enhanced BFD and/or BFR. The BS 102 may indicate to enable the enhanced BFD and/or BFR in response to detecting certain criteria, such as the criteria described herein with respect to step 604.

At step 608, the BS 102 may transmit a reference signal (RS) via a transmit beam (e.g., the beam 402 as shown in FIG. 4), and the UE 104 may receive the reference signal via a receive beam (e.g., the beam 406 in FIG. 4). For example, the BS 102 may transmit an SSB and/or a CSI-RS with a particular beam shape and/or in a particular beam direction (e.g., elevation and/or azimuth). The BS 102 may transmit the reference signal periodically over time, for example, every 5 milliseconds (ms), 10 ms, 20 ms, 40 ms, 80 ms, or 160 ms.

At step 610, the UE 104 may detect a beam failure associated with the reference signal. For example, the UE 104 may detect that channel conditions for the reference signal received via the beam 406 are in a state associated with beam failure (e.g., an RSRP is less than or equal to a threshold). The UE 104 may apply the enhanced criteria for detecting the beam failure as further described herein, such as an RSRP being less than or equal to a threshold for a certain duration or reception of the reference signal being blocked for a certain duration. In certain aspects, the threshold and/or duration for the enhanced BFD may be separate from the threshold and duration used for detecting a BFI or identifying a candidate beam. The threshold for the enhanced BFD may be less than the threshold used for detecting a BFI or identifying a candidate beam. The threshold for the enhanced BFD may be set to a level where it may be assumed that the channel conditions for the beam are in such a state that detecting a beam failure with BFI counts can be skipped. In certain cases (for example, when there is severe blocking, channel strength deterioration, etc. detected by the UE as further described herein), the beam failure detection at step 610 may not consider the BFI counts in declaring beam failure. Such a beam failure detection may enable the UE to recover communications with the BS faster than relying on BFI counts.

At step 612, the UE 104 may transmit a beam switch request to the BS 102 in response to the beam failure detection at step 610. In certain aspects, the beam switch request may include a report associated with the detected beam failure, such as preferred candidate beams (e.g., the beam 408 may be indicated as a preferred candidate beam) or an indication of the channel conditions associated with the current beam and/or the candidate beams.

Optionally, at step 614, the BS 102 may transmit, to the UE 104, an indication to communicate via a beam (e.g., the beam 408) in response to the beam switch request at step 612. The indication to communicate via a beam may be indicated via a quasi-colocation (QCL) relationship (e.g., spatial parameters) associated with a reference signal. For example, the BS 102 may indicate to activate a beam through a reference signal identifier associated with QCL spatial parameters or a Transmission Configuration Indicator (TCI) state associated with a particular beam (e.g., transmission and/or reception spatial parameters). In certain aspects, the BS 102 may grant one of the preferred beams as indicated by the UE or a different beam. That is, the BS 102 may decide whether to grant one of the preferred beams or a different beam to the UE 104.

Optionally, at step 616, the UE 104 may initiate a beam failure recovery procedure, for example, using a RA procedure as described herein. As an example, the UE 104 may initiate a four-step CFRA procedure to recover communications with the BS 102. In certain cases, the UE 104 may initiate the RA-based beam failure recovery procedure in response to detecting that the UE failed to receive or to successfully decode a response to the beam switch request at step 612.

At step 618, the UE 104 may communicate with the BS 102 via the beam as granted in step 614 and/or step 616. For example, the UE 104 may receive, from the BS 102, data or control information via a reception beam according to the granted beam.

Optionally, at step 620, the UE 104 may request to disable the enhanced BFD and/or BFR. For example, the 104 may request to disable the enhanced BFD and/or BFR in response to detecting certain criteria, such as a particular service type or channel conditions. Optionally, at step 622, the BS 102 may instruct the UE 104 to disable the enhanced BFD and/or BFR.

FIG. 6 depicts an example of beam failure detection and recovery that may facilitate faster establishment of a new beam for the UE and/or faster initiation of the RACH procedure in response to beam failure detection.

Example Methods of Beam Failure Detection and Recovery

Figure 7:
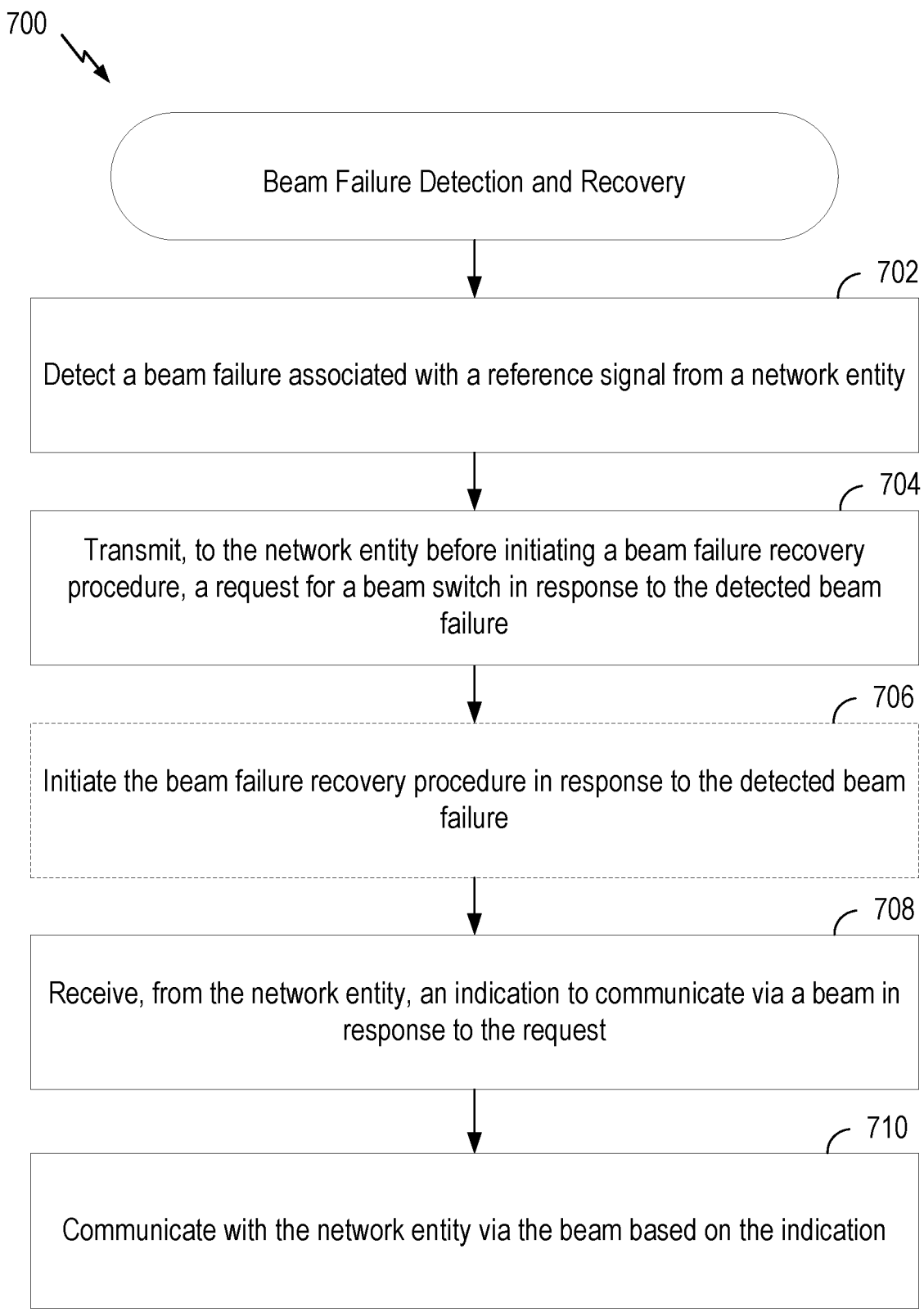
FIG. 7 depicts an example method for beam failure detection and recovery.

FIG. 7 depicts an example method 700 for beam failure detection and recovery.

The method 700 may optionally begin, at step 702, where the UE (e.g., the UE 104) may detect a beam failure associated with a reference signal from a network entity (e.g., the BS 102). For example, the UE may monitor a reference signal from the network entity via a particular beam, such as the beam 406 as depicted in FIG. 4, and the UE may detect that the RSRP for the reference signal is less than or equal to a threshold for a certain duration (e.g., 5 ms or 10 ms). In certain aspects, the detection of the beam failure may be based at least in part on BFI counts and a maximum count for the BFI(s) as described herein. As used herein, a network entity may refer to a wireless communication device in a radio access network, such as a base station, a remote radio head or antenna panel in communication with a base station, and/or network controller.

At step 704, the UE may transmit, to the network entity before initiating a beam failure recovery procedure, a request for a beam switch in response to the detected beam failure. The transmission of the beam switch request may enable the UE to recover communications with the network entity faster than initiating a RA-based beam failure recovery procedure. For example, the UE may transmit the request for beam switch before initiating a beam failure recovery procedure using a RACH procedure. The UE may transmit the request for beam switch via the same beam on which the beam failure is detected or a different beam.

Optionally, at step 706, the UE may initiate the beam failure recovery procedure in response to the detected beam failure. For example, the UE may initiate a RACH procedure (such as the RACH procedure 500A and/or 500B) for beam failure recovery using a candidate beam with an RSRP that is greater than or equal to a threshold. The UE may transmit a RA preamble having a preamble sequence and/or via RA resources specific to a beam failure recovery. That is, the value of the RA preamble sequence and/or RA resources used to transmit the RA preamble may indicate that the RACH procedure is for beam failure recovery. In certain aspects, the UE may initiate the beam failure recovery procedure instead of sending the beam switch request but in response to enhanced BFD, as further described herein. That is, the UE may perform the enhanced BFD without the enhanced BFR (e.g., sending the beam switch request and/or report). Expressed another way, the UE may go directly to beam failure recovery using a RACH procedure without transmitting the request at step 704. In certain cases, the UE may initiate the beam failure recovery procedure at the same time as sending the beam switch request. For example, the UE may transmit the beam switch request and the RA preamble in the same transmission occasion.

At step 708, the UE may receive, from the network entity, an indication to communicate via a beam in response to the request. For example, the UE may receive signaling that indicates to activate a specific beam for communication (e.g., the beam 408 as illustrated in FIG. 4). The indication may be received via RRC signaling, MAC signaling, DCI, and/or system information. In aspects, the UE may include an indication to activate a specific Transmission Configuration Indicator (TCI) state associated with a particular beam (e.g., transmission and/or reception spatial parameters) or one or more other quasi-colocation (QCL) types.

At step 710, the UE may communicate with the network entity via the beam based on the indication. For example, the UE may receive data and/or control information from the network entity via the beam indicated at step 708. The UE may transmit data and/or control information to the network entity via the beam indicated at step 708. Communicating via the beam may include the UE receiving signal(s) from the network entity and/or the UE transmitting signal(s) to the network entity via the beam.

In certain aspects, the UE may transmit the request for beam switch with information associated with the beam failure detection. For example, request may include one or more preferred candidate beam(s) for the beam switch. In aspects, the preferred candidate beam(s) may be selected from a list of candidate beams for beam failure recovery (e.g., as indicated in candidateBeamRSList). The UE may select the preferred candidate beam(s) from the list of candidate beams that has a signal power (e.g., RSRP) or another measure of energy greater than or equal to a threshold. The indication of preferred candidate beam(s) may provide one or more beams, and in certain cases, the indication of preferred beam(s) may indicate the same beam on which beam failure was detected. For certain aspects, the request may include a beam failure reason. That is, the request may include a reason for detecting the beam failure, for example, due to noise, interference, spatial blockage between the UE and network entity, mobility of the UE, etc. In certain aspects, the request may include channel condition information, such as CSI feedback, a channel quality indicator, signal-to-noise ratio (SNR), signal-to-interference plus noise ratio (SINR), signal-to-noise plus distortion ratio (SNDR), reference signal received power (RSRP), and/or a received signal strength indicator (RSSI). The channel condition information may be associated with at least one of the reference signal for the beam or another reference signal associated with a candidate beam (e.g., a preferred candidate beam).

For certain aspects, the UE may transmit the request for beam switch using various uplink signaling. For example, the UE may transmit the request in UCI or a MAC control element (MAC-CE).

According to certain aspects, the UE may detect the beam failure at step 702 using enhanced BFD and/or the BFI counts. For enhanced BFD, the UE may detect that a catastrophic event with respect to the channel conditions for a beam has occurred and declare a beam failure without considering the BFI count. That is, the UE may detect certain criteria that triggers the UE to skip waiting for BFI counts reaching the maximum BFI count to declare a beam failure. The UE may declare beam failure immediately in response to the detection of the criteria without going through the BFI counting mechanism.

As an example of the criteria for enhanced BFD, the UE may detect the beam failure based at least in part on the reference signal having a SNR, SINR, or RSRP less than or equal to a threshold for a period of time (T1). That is, if the SNR, SINR, or RSRP is less than or equal to a threshold for a period of time, the UE may declare that a beam failure has occurred. In aspects, the threshold for enhanced BFD may be separate from the threshold used for detecting a BFI. The UE may detect an extremely low SNR, SINR, or RSRP for the reference signal for a consecutive period of time and declare the beam failure. That is, the threshold for the enhanced BFD may be less than the threshold for detecting a BFI. In certain aspects, the UE may detect RF blocking (e.g., due to a physical obstruction) between the UE and network entity for a period of time (T2). For example, the UE may detect the absence of the reference signal during the transmission occasions for the reference signal (e.g., the SSB or CSI-RS periodicity). With respect to the method 700, detecting the beam failure at step 702 may include at least one of detecting a first condition that a measure of an energy level associated with the reference signal is less than or equal to a threshold for a first duration (e.g., 5 ms or 10 ms), or detecting a second condition that reception of the reference signal is blocked for a second duration (e.g., 5 ms or 10 ms). The measure of the energy level may include the CQI, SNR, SINR, SNDR, RSRP, and/or RSSI associated with the reference signal.

In certain aspects, triggering the beam switch request at step 704 and/or beam failure recovery at step 706 may be performed with or without the BFI counting framework. For example, the UE may detect the beam failure in response to detecting the first condition or the second condition without considering BFIs. In certain cases, the UE may adjust the BFI count and/or maximum count in order to declare a beam failure. As an example, the UE may increase a counter for BFIs to a maximum count for BFIs in response to detecting the first condition or the second condition. The UE may decrease a maximum count for BFIs to a current count of the BFIs in response to detecting the first condition or the second condition. In such cases, the adjustment of the BFI count and/or maximum count will trigger the UE to send the beam switch request and/or initiate the RA-based beam failure recovery procedure.

Enhanced BFD and/or BFR may be enabled (activated) and/or disabled (deactivated) at the UE. For example, the UE may request to activate or deactivate enhanced BFD and/or BFR, for example, via a MAC-CE or UCI. The UE may transmit, to the network entity, an indication to activate or deactivate sending the request in response to a beam failure detection or the criteria that detect beam failure without considering the BFI count. The network entity may instruct the UE to activate or deactivate enhanced BFD or BFR, for example, via RRC signaling, MAC signaling, DCI, and/or system information. The UE may receive, from the network entity, an indication to activate or deactivate sending the request in response to a beam failure detection In certain aspects, the enhanced BFD and/or BFR may be enabled and/or disabled based on certain criteria, such as channel conditions and/or a specific service type. Enhanced BFD and/or BFR may be activated/deactivated based on a channel condition measurement (such as current measurement or a set of measurements for a period of time) and/or a change of service type (e.g., changing from eMBB to URLLC). For example, if the measurements for channel conditions are less than or equal to a threshold for a period of time, the UE may enable the enhanced BFD and/or BFR. If the measurements for channel conditions are greater than or equal to a threshold for a period of time, the UE may disable the enhanced BFD and/or BFR. The threshold for enabling or disabling the enhanced BFD and/or BFR may be separate from the thresholds for detecting beam failure. For certain aspects, a specific service type may trigger the enablement or disablement of enhanced BFD and/or BFR. For example, if the UE is using a channel for URLLC traffic, the UE may enable the enhanced BFD and/or BFR for that channel. If the UE is using the channel for eMBB traffic, the UE may disable the enhanced BFD and/or BFR for that channel. The UE may determine whether to activate or deactivate enhanced BFD (e.g., the criteria that detect beam failure without considering the BFI count) and/or enhanced BFR (e.g., sending the request in response to a beam failure detection) based at least in part on one or more criteria. The criteria may include a service type, a current measure of an energy level associated with the reference signal being less than a threshold, or the measure of the energy level associated with the reference signal being less than the threshold for a duration (e.g., 5 ms or 10 ms).

For certain aspects, the UE may be configured with the event(s) and associated parameters (e.g., a threshold and/or duration) that triggers the beam failure detection at step 702 or the content to report with the beam switch request at step 704. The UE may receive, from the network entity, a configuration indicating information to report with the request and/or the event(s) and associated parameters that triggers the beam failure detection. The UE may receive, from the network entity, a configuration indicating one or more first conditions (e.g., the threshold and duration) for detecting the beam failure or one or more second conditions for activating or deactivating sending the request in response to a beam failure detection or the criteria that detect beam failure without considering the BFI count. The UE may be configured with multiple sets of configurations for enhanced BFD and/or BFR, and the UE may switch to a different configuration set in response to signaling (e.g., MAC-CE and/or DCI) from the network entity and/or detecting certain criteria such as a service type or certain channel conditions.

Figure 8:
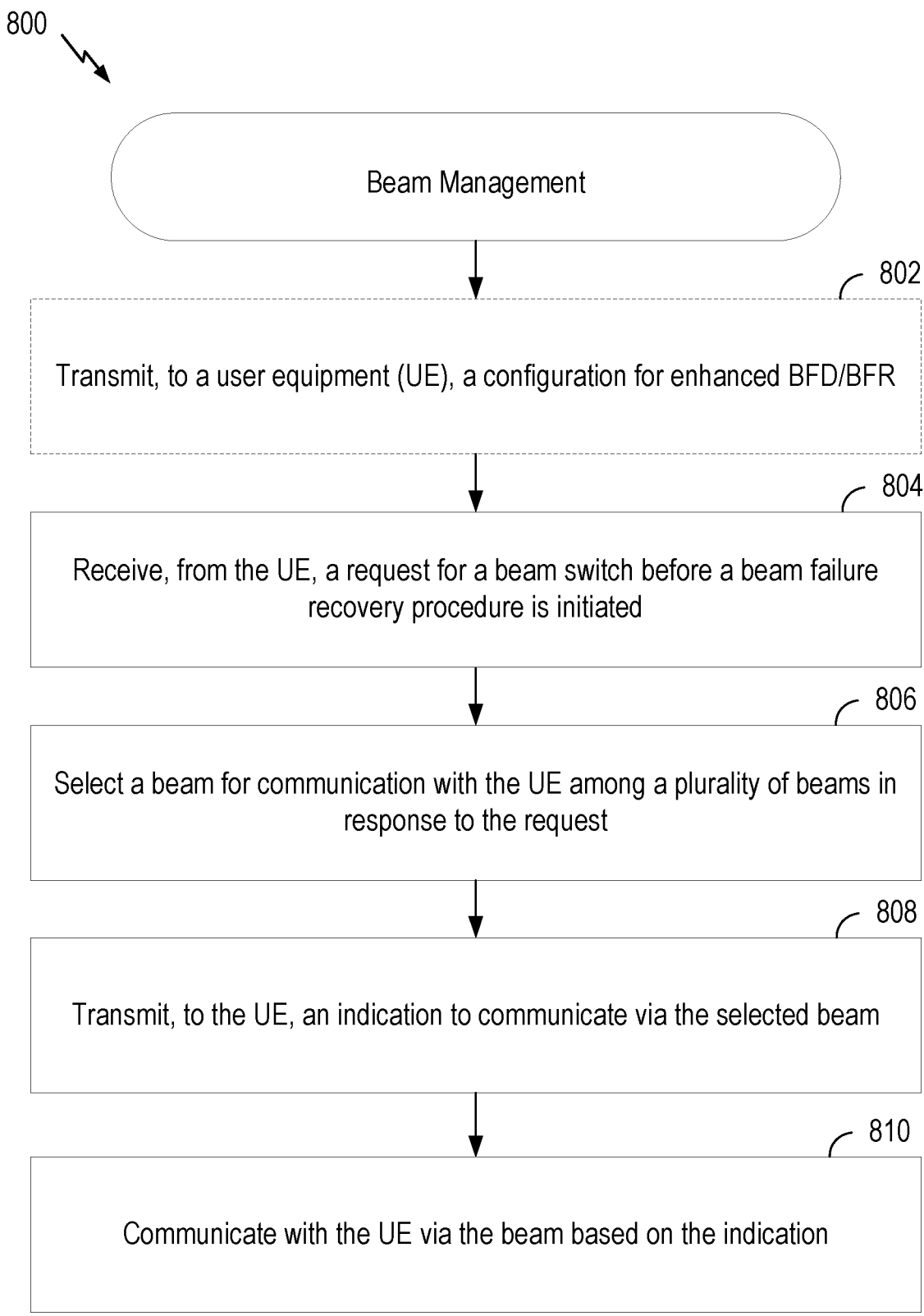
FIG. 8 depicts an example method for beam management.

FIG. 8 depicts an example method 800 for beam management such as configuring enhanced BFD and/or BFR.

The method 800 may optionally begin, at step 802, where a network entity (e.g., the BS 102) may transmit, to a UE (e.g., the UE 104), a configuration for enhanced BFD and/or BFR, for example, as described herein with respect to FIGS. 6 and 7.

At step 804, the network entity may receive, from the UE, a request for a beam switch before a beam failure recovery procedure is initiated. The network entity may receive the request before a RA-based beam failure recovery procedure is initiated. For example, the network entity may receive the request before receiving an RA preamble specified for beam failure recovery. In certain cases, the network entity may receive the beam switch request in the same transmission occasion as the RA preamble specified for beam failure recovery.

At step 806, the network entity may select a beam for communication with the UE among a plurality of beams in response to the request. For example, the network entity may select the beam based on channel conditions for the beams as reported by the UE or measured by the network entity and/or other criteria such as network load or spectral usage for the beams. The network entity may select the beam from preferred candidate beams indicated by the UE. The network entity may select the beam based on the network entity's own measurements or criteria.

At step 808, the network entity may transmit, to the UE, an indication to communicate via the selected beam. For example, the network entity may activate a specific TCI state associated with the selected beam.

At step 810, the network entity may communicate with the UE via the beam based on the indication. For example, the network entity may receive data or control information from the UE or transmit data or control information to the UE via the beam.

For certain aspects, the request for beam switch may include information associated with the beam failure detection at the UE, for example, as described herein with respect to the method 700. For example, the request may include one or more preferred candidate beams, a reason for detecting the beam failure, channel condition information associated with at least one of the reference signal or another reference signal associated with a candidate beam. The network entity may select the beam based at least in part on the information included in the request. For example, the network entity may select the beam based at least in part on the preferred candidate beams, the reason for beam failure, and/or the channel condition information. As an example, the network entity may not select the same beam on which beam failure was detected if the reason for beam failure is due to a specific reason, such as mobility and/or RF blockage. The network entity may select a beam with the best channel conditions (e.g., the highest RSRP) as indicated from the channel condition information in the request.

In certain aspects, the network entity may receive the request for beam switch using various uplink signaling. For example, the network entity may receive the request in UCI or MAC signaling.

For certain aspects, the network entity may receive a message indicating beam failure detection at the UE via a RACH. The network entity may receive the RA message after receiving the request, in place of the request, or in the same transmission occasion as the request. In certain aspects, the RA message may include a RA preamble specified for beam failure recovery.

Enhanced BFD and/or BFR may be activated and/or deactivated at the UE, for example, as described herein with respect to the method 700. As an example, the network entity may receive, from the UE, an indication to activate or deactivate sending the request in response to a beam failure detection. The network entity may transmit, to the UE, an indication to activate or deactivate sending the request in response to a beam failure detection.

The network entity may configure the UE with the event(s) and associated parameters (e.g., a threshold and/or duration) that triggers the beam failure detection at the UE or the content to report with the beam switch request, for example, as described herein with respect to the method 700. The network entity may transmit, a configuration indicating information to report with the request. The network entity may transmit, to the UE, a configuration indicating one or more first conditions for detecting the beam failure or one or more second conditions for activating or deactivating sending the request in response to a beam failure detection. In certain aspects, the first conditions may include a third condition that a measure of an energy level associated with the reference signal is less than or equal to a threshold for a first duration, or a fourth condition that reception of the reference signal is blocked for a second duration. The network entity may configure the UE with how to implement the BFI framework in conjunction with the enhanced BFD. For example, the configuration may indicate to detect the beam failure in response to detecting certain criteria (e.g., the third condition or the fourth condition) without considering BFIs. The configuration may indicate to increase a counter for BFIs to a maximum count for BFIs in response to detecting certain criteria (e.g., the third condition or the fourth condition). The configuration may indicate to decrease a maximum count for BFIs to a current count of the BFIs in response to detecting certain criteria (e.g., the third condition or the fourth condition).

It will be appreciated that the enhanced BFD and/or BFR described herein provides various advantages. For example, the enhanced BFD may facilitate faster detection of a beam failure at a UE, for example, compared to the BFI counting framework. Such beam failure detection may enable the UE to establish a new beam for communications via the beam switch request or initiate a RACH procedure for beam failure recovery. In certain cases, the beam switch request may enable faster beam failure recovery compared to using the RACH procedure(s).

Example Wireless Communication Devices

Figure 9:
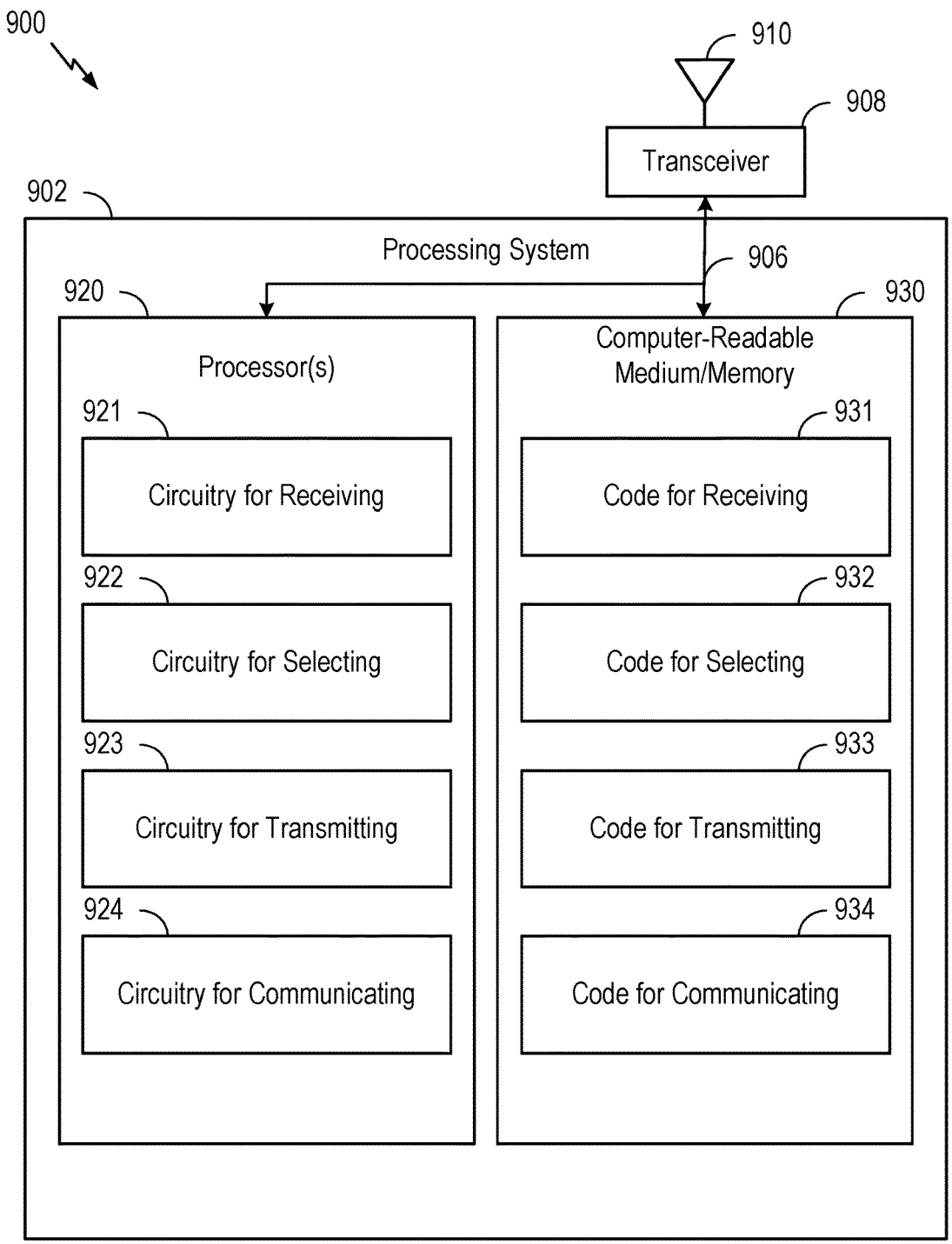
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 6 and 8. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 6 and 8, or other operations for performing the various techniques discussed herein for beam management.

In the depicted example, computer-readable medium/memory 930 stores code 931 for receiving, code 932 for selecting, code 933 for transmitting, and/or code 934 for communicating.

In the depicted example, the one or more processors 920 include circuitry configured to implement the code stored in the computer-readable medium/memory 930, including circuitry 921 for receiving, circuitry 922 for selecting, circuitry 923 for transmitting, and/or circuitry 924 for communicating.

Various components of communications device 900 may provide means for performing the methods described herein, including with respect to FIGS. 6 and 8.

In some examples, means for transmitting, communicating, or sending (or means for outputting for transmission) may include the transceivers 232 and/or antenna(s) 234 of the base station 102 illustrated in FIG. 2 and/or transceiver 908 and antenna 910 of the communication device 900 in FIG. 9.

In some examples, means for receiving or communicating (or means for obtaining) may include the transceivers 232 and/or antenna(s) 234 of the base station illustrated in FIG. 2 and/or transceiver 908 and antenna 910 of the communication device 900 in FIG. 9.

In some examples, means for selecting may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including beam management component 241).

Notably, FIG. 9 is an example, and many other examples and configurations of communication device 900 are possible.

Figure 10:
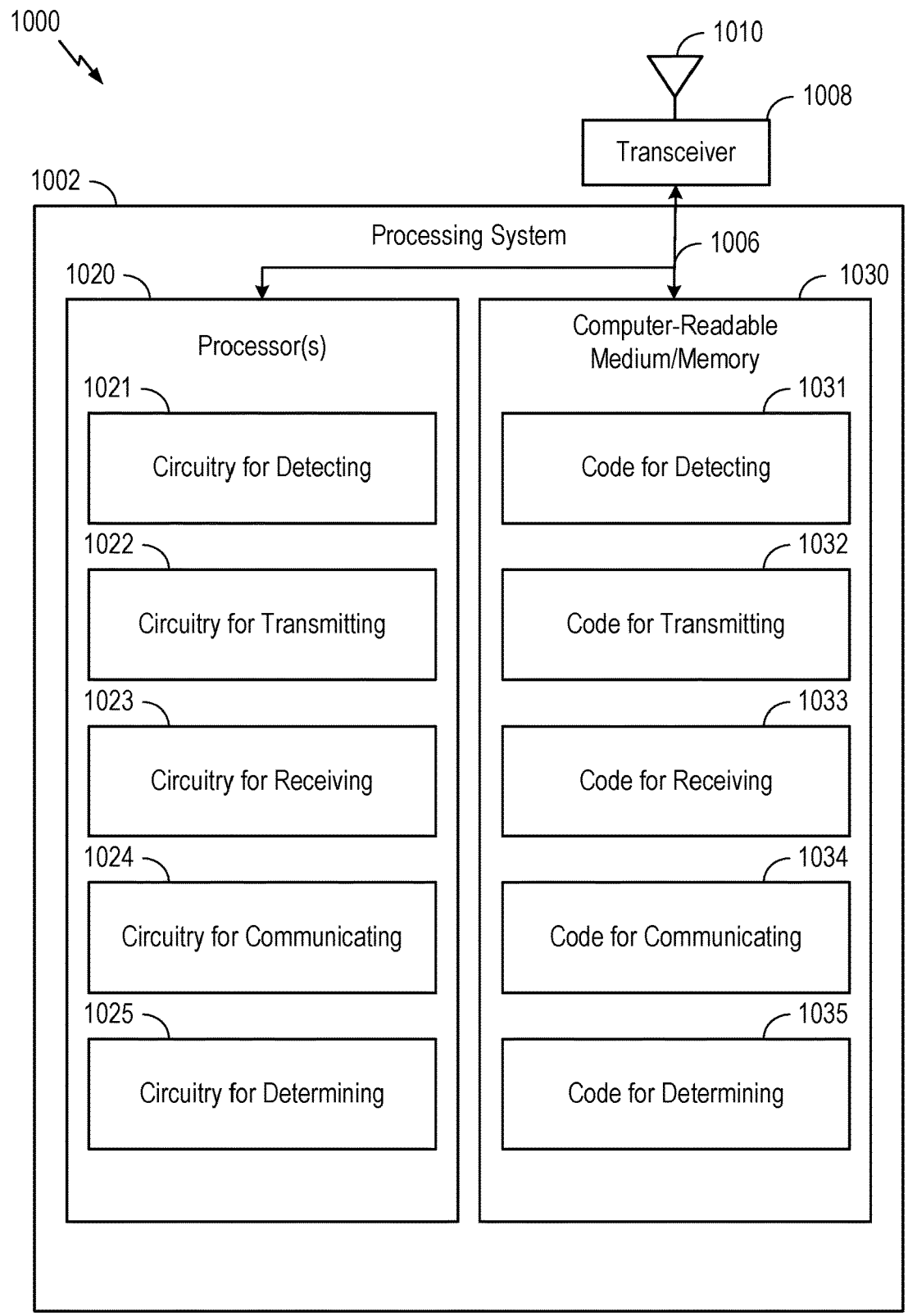
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 6 and 7. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS.

6 and 7, or other operations for performing the various techniques discussed herein for beam failure detection and recovery.

In the depicted example, computer-readable medium/memory 1030 stores code 1031 for detecting, code 1032 for transmitting, code 1033 for receiving, code 1034 for communicating, and/or code 1035 for determining.

In the depicted example, the one or more processors 1020 include circuitry configured to implement the code stored in the computer-readable medium/memory 1030, including circuitry 1021 for detecting, circuitry 1022 for transmitting, circuitry 1023 for receiving, circuitry 1024 for communicating, and/or circuitry 1025 for determining.

Various components of communications device 1000 may provide means for performing the methods described herein, including with respect to FIGS. 6 and 7.

In some examples, means for transmitting, communicating, or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving or communicating (or means for obtaining) may include the transceivers 254 and/or antenna(s) 252 of the user equipment 104 illustrated in FIG. 2 and/or transceiver 1008 and antenna 1010 of the communication device 1000 in FIG. 10.

In some examples, means for detecting and/or determining may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including beam failure component 281).

Notably, FIG. 10 is an example, and many other examples and configurations of communication device 1000 are possible.

Example Clauses

Implementation examples are described in the following numbered clauses:

Clause 1: A method of wireless communication by a user equipment, comprising: detecting a beam failure associated with a reference signal from a network entity; transmitting, to the network entity before initiating a beam failure recovery procedure, a request for a beam switch in response to the detected beam failure; receiving, from the network entity, an indication to communicate via a beam in response to the request; and communicating with the network entity via the beam based on the indication.

Clause 2: The method of Clause 1, wherein the request includes at least one of one or more preferred candidate beams, a reason for detecting the beam failure, or channel condition information associated with at least one of the reference signal or another reference signal associated with a candidate beam.

Clause 3: The method according to any one of Clauses 1 or 2, wherein transmitting the request includes transmitting the request in uplink control information or a medium access control (MAC) control element.

Clause 4: The method according to any one of Clauses 1-3, wherein detecting the beam failure comprises at least one of: detecting a first condition that a measure of an energy level associated with the reference signal is less than or equal to a threshold for a first duration, or detecting a second condition that reception of the reference signal is blocked for a second duration.

Clause 5: The method of Clause 4, wherein detecting the beam failure comprises detecting the beam failure in response to detecting the first condition or the second condition without considering beam failure instance indications (BFIs).

Clause 6: The method of Clause 4, wherein detecting the beam failure comprises increasing a counter for BFIs to a maximum count for BFIs in response to detecting the first condition or the second condition.

Clause 7: The method of Clause 4, wherein detecting the beam failure comprises decreasing a maximum count for BFIs to a current count of the BFIs in response to detecting the first condition or the second condition.

Clause 8: The method according to any one of Clauses 1-7, further comprising initiating the beam failure recovery procedure in response to the detected beam failure.

Clause 9: The method according to any one of Clauses 1-8, further comprising transmitting, to the network entity, an indication to activate or deactivate sending the request in response to a beam failure detection.

Clause 10: The method according to any one of Clauses 1-9, further comprising receiving, from the network entity, an indication to activate or deactivate sending the request in response to a beam failure detection.

Clause 11: The method according to any one of Clauses 1-10, further comprising determining whether to activate or deactivate sending the request in response to a beam failure detection based at least in part on one or more criteria.

Clause 12: The method of Clause 11, wherein the one or more criteria include a service type, a current measure of an energy level associated with the reference signal being less than a threshold, or the measure of the energy level associated with the reference signal being less than the threshold for a duration.

Clause 13: The method according to any one of Clauses 1-12, further comprising receiving, from the network entity, a configuration indicating information to report with the request.

Clause 14: The method according to any one of Clauses 1-12, further comprising receiving, from the network entity, a configuration indicating one or more first conditions for detecting the beam failure or one or more second conditions for activating or deactivating sending the request in response to a beam failure detection.

Clause 15: A method of wireless communication by a network entity, comprising: receiving, from a user equipment (UE), a request for a beam switch before a beam failure recovery procedure is initiated; selecting a beam for communication with the UE among a plurality of beams in response to the request; transmitting, to the UE, an indication to communicate via the selected beam; and communicating with the UE via the beam based on the indication.

Clause 16: The method of Clause 15, wherein: the request includes at least one of one or more preferred candidate beams, a reason for detecting the beam failure, or channel condition information associated with at least one of the reference signal or another reference signal associated with a candidate beam; and selecting the beam comprises selecting the beam based at least in part on the one or more preferred candidate beams, the reason, or the channel condition information.

Clause 17: The method according to any one of Clauses 15 or 16, wherein receiving the request includes receiving the request in uplink control information or a medium access control (MAC) control element.

Clause 18: The method according to any one of Clauses 15-17, further comprising receiving, from the UE after receiving the request, a message indicating a beam failure detection at the UE via a random access channel.

Clause 19: The method according to any one of Clauses 15-18, further comprising receiving, from the UE, an indication to activate or deactivate sending the request in response to a beam failure detection.

Clause 20: The method according to any one of Clauses 15-19, further comprising transmitting, to the UE, an indication to activate or deactivate sending the request in response to a beam failure detection.

Clause 21: The method according to any one of Clauses 15-20, further comprising transmitting, to the UE, a configuration indicating information to report with the request.

Clause 22: The method according to any one of Clauses 15-20, further comprising transmitting, to the UE, a configuration indicating one or more first conditions for detecting the beam failure or one or more second conditions for activating or deactivating sending the request in response to a beam failure detection.

Clause 23: The method of Clause 22, wherein the one or more first conditions include: a third condition that a measure of an energy level associated with the reference signal is less than or equal to a threshold for a first duration, or a fourth condition that reception of the reference signal is blocked for a second duration.

Clause 24: The method of Clause 23, wherein the configuration indicates to detect the beam failure in response to detecting the third condition or the fourth condition without considering beam failure instance indications (BFIs).

Clause 25: The method of Clause 23, wherein the configuration indicates to increase a counter for BFIs to a maximum count for BFIs in response to detecting the third condition or the fourth condition.

Clause 26: The method of Clause 23, wherein the configuration indicates to decrease a maximum count for BFIs to a current count of the BFIs in response to detecting the third condition or the fourth condition.

Clause 27: An apparatus for wireless communication, comprising, comprising: a memory; and a processor coupled to the memory, the processor and the memory being configured to: detect a beam failure associated with a reference signal from a network entity, transmit, to the network entity before initiating a beam failure recovery procedure, a request for a beam switch in response to the detected beam failure, receive, from the network entity, an indication to communicate via a beam in response to the request, and communicate with the network entity via the beam based on the indication.

Clause 28: The apparatus of Clause 27, wherein the request includes at least one of one or more preferred candidate beams, a reason for detecting the beam failure, or channel condition information associated with at least one of the reference signal or another reference signal associated with a candidate beam.

Clause 29: A non-transitory computer-readable medium storing code that, when executed by one or more processors of an apparatus, cause the apparatus to perform a method, the method comprising: detecting a beam failure associated with a reference signal from a network entity; transmitting, to the network entity before initiating a beam failure recovery procedure, a request for a beam switch in response to the detected beam failure; receiving, from the network entity, an indication to communicate via a beam in response to the request; and communicating with the network entity via the beam based on the indication.

Clause 30: The computer-readable medium of Clause 29, wherein the request includes at least one of one or more preferred candidate beams, a reason for detecting the beam failure, or channel condition information associated with at least one of the reference signal or another reference signal associated with a candidate beam.

Clause 31: An apparatus, comprising: a memory comprising executable instructions; one or more processors configured to execute the executable instructions and cause the apparatus to perform a method in accordance with any one of Clauses 1-26.

Clause 32: An apparatus, comprising means for performing a method in accordance with any one of Clauses 1-26.

Clause 33: A non-transitory computer-readable medium comprising executable instructions that, when executed by one or more processors of an apparatus, cause the apparatus to perform a method in accordance with any one of Clauses 1-26.

Clause 34: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols. MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of beam failure detection and recovery in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment, comprising:
    detecting a beam failure associated with a reference signal from a network entity, wherein detecting the beam failure comprises detecting a first condition that reception of the reference signal is blocked for a first duration, and wherein the reference signal is a synchronization signal block (SSB) or a channel state information (CSI) reference signal (RS);
    transmitting, to the network entity before initiating a beam failure recovery procedure, a request for a beam switch in response to the detected beam failure;
    receiving, from the network entity, an indication to communicate via a beam in response to the request; and
    communicating with the network entity via the beam based on the indication.

2. The method of claim 1, wherein the request includes at least one of one or more preferred candidate beams, a reason for detecting the beam failure, or channel condition information associated with at least one of the reference signal or another reference signal associated with a candidate beam.

3. The method of claim 1, wherein transmitting the request includes transmitting the request in uplink control information or a medium access control (MAC) control element.

4. The method of claim 1, wherein detecting the beam failure comprises detecting a first second condition that a measure of an energy level associated with the reference signal is less than or equal to a threshold for a second duration.

5. The method of claim 4, wherein detecting the beam failure comprises detecting the beam failure in response to detecting the first condition or the second condition without considering beam failure instance indications (BFIs).

6. The method of claim 4, wherein detecting the beam failure comprises increasing a counter for BFIs to a maximum count for BFIs in response to detecting the first condition or the second condition.

7. The method of claim 4, wherein detecting the beam failure comprises decreasing a maximum count for BFIs to a current count of the BFIs in response to detecting the first condition or the second condition.

8. The method of claim 1, further comprising initiating the beam failure recovery procedure in response to the detected beam failure.

9. The method of claim 1, further comprising transmitting, to the network entity, an indication to activate or deactivate sending the request in response to a beam failure detection.

10. The method of claim 1, further comprising receiving, from the network entity, an indication to activate or deactivate sending the request in response to a beam failure detection.

11. The method of claim 1, further comprising determining whether to activate or deactivate sending the request in response to a beam failure detection based at least in part on one or more criteria.

12. The method of claim 11, wherein the one or more criteria include a service type, a current measure of an energy level associated with the reference signal being less than a threshold, or the measure of the energy level associated with the reference signal being less than the threshold for a duration.

13. The method of claim 1, further comprising receiving, from the network entity, a configuration indicating information to report with the request.

14. The method of claim 1, further comprising receiving, from the network entity, a configuration indicating one or more first conditions for detecting the beam failure or one or more second conditions for activating or deactivating sending the request in response to a beam failure detection.

15. An apparatus for wireless communication, comprising:
    a memory comprising instructions; and
    one or more processors configured to execute the instructions and cause the apparatus to:
        detect a beam failure associated with a reference signal from a network entity by detecting a first condition that reception of the reference signal is blocked for a first duration, wherein the reference signal is a synchronization signal block (SSB) or a channel state information (CSI) reference signal (RS),
        transmit, to the network entity before initiating a beam failure recovery procedure, a request for a beam switch in response to the detected beam failure,
        receive, from the network entity, an indication to communicate via a beam in response to the request, and
        communicate with the network entity via the beam based on the indication.

16. The apparatus of claim 15, wherein the request includes at least one of one or more preferred candidate beams, a reason for detecting the beam failure, or channel condition information associated with at least one of the reference signal or another reference signal associated with a candidate beam.

17. The apparatus of claim 15, wherein the one or more processors are configured to execute the instructions and cause the apparatus to communicate with the network entity via the beam based on the indication and transmit the request in uplink control information or a medium access control (MAC) control element.

18. The apparatus of claim 15, wherein to detect the beam failure, the one or more processors are configured to execute the instructions and cause the apparatus to: detect a second condition that a measure of an energy level associated with the reference signal is less than or equal to a threshold for a second duration.

19. The apparatus of claim 18, wherein to detect the beam failure, the one or more processors are configured to execute the instructions and cause the apparatus to detect the beam failure in response to detecting the first condition or the second condition without considering beam failure instance indications (BFIs).

20. The apparatus of claim 18, wherein to detect the beam failure, the one or more processors are configured to execute the instructions and cause the apparatus to increase a counter for BFIs to a maximum count for BFIs in response to detecting the first condition or the second condition.

21. The apparatus of claim 18, wherein to detect the beam failure, the one or more processors are configured to execute the instructions and cause the apparatus to decrease a maximum count for BFIs to a current count of the BFIs in response to detecting the first condition or the second condition.

22. The apparatus of claim 15, wherein the one or more processors are configured to execute the instructions and cause the apparatus to initiate the beam failure recovery procedure in response to the detected beam failure.

23. The apparatus of claim 15, wherein the one or more processors are configured to execute the instructions and cause the apparatus to transmit, to the network entity, an indication to activate or deactivate sending the request in response to a beam failure detection.

24. The apparatus of claim 15, wherein the one or more processors are configured to execute the instructions and cause the apparatus to receive, from the network entity, an indication to activate or deactivate sending the request in response to a beam failure detection.

25. The apparatus of claim 15, wherein the one or more processors are configured to execute the instructions and cause the apparatus to determine whether to activate or deactivate sending the request in response to a beam failure detection based at least in part on one or more criteria, and wherein the one or more criteria include a service type, a current measure of an energy level associated with the reference signal being less than a threshold, or the measure of the energy level associated with the reference signal being less than the threshold for a duration.

26. The apparatus of claim 15, wherein the one or more processors are configured to execute the instructions and cause the apparatus to receive, from the network entity, a configuration indicating information to report with the request.

27. The apparatus of claim 15, wherein the one or more processors are configured to execute the instructions and cause the apparatus to receive, from the network entity, a configuration indicating one or more first conditions for detecting the beam failure or one or more second conditions for activating or deactivating sending the request in response to a beam failure detection.

28. A non-transitory computer-readable medium storing code that, when executed by one or more processors of an apparatus, cause the apparatus to perform a method, the method comprising:

detecting a beam failure associated with a reference signal from a network entity, wherein detecting the beam failure comprises detecting a first condition that reception of the reference signal is blocked for a first duration, and wherein the reference signal is a synchronization signal block (SSB) or a channel state information (CSI) reference signal (RS);

transmitting, to the network entity before initiating a beam failure recovery procedure, a request for a beam switch in response to the detected beam failure;

receiving, from the network entity, an indication to communicate via a beam in response to the request; and communicating with the network entity via the beam based on the indication.

29. The computer-readable medium of claim 28, wherein the request includes at least one of one or more preferred candidate beams, a reason for detecting the beam failure, or channel condition information associated with at least one of the reference signal or another reference signal associated with a candidate beam.

30. An apparatus for wireless communication, comprising:

means for detecting a beam failure associated with a reference signal from a network entity, wherein detecting the beam failure comprises detecting a first condition that reception of the reference signal is blocked for a first duration, and wherein the reference signal is a synchronization signal block (SSB) or a channel state information (CSI) reference signal (RS);

means for transmitting, to the network entity before initiating a beam failure recovery procedure, a request for a beam switch in response to the detected beam failure;

means for receiving, from the network entity, an indication to communicate via a beam in response to the request; and means for communicating with the network entity via the beam based on the indication.

* * * * *